March 3, 1959     I. S. WITTELSHOFER     2,875,945
BAG-LIKE PROTECTIVE WRAPPING FOR AUTOMOBILE
BUMPERS AND THE LIKE
Filed June 25, 1956

*INVENTOR.*
IRA S. WITTELSHOFER
BY
ATTORNEY

United States Patent Office 2,875,945
Patented Mar. 3, 1959

2,875,945

BAG-LIKE PROTECTIVE WRAPPING FOR AUTOMOBILE BUMPERS AND THE LIKE

Ira S. Wittelshofer, St. Louis, Mo., assignor to Central States Paper & Bag Co., St. Louis, Mo., a corporation of Missouri Application June 25, 1956, Serial No. 593,520

3 Claims. (Cl. 229—87)

This invention relates in general to certain new and useful improvements in protective wrapping devices and, more particularly, a bag-like protective wrapping for automobile bumpers.

As new automobiles come off the assembly line, it has been found necessary to protect the outer or so-called "corner" portions of the chromium-plated bumpers. These parts of the new automobile are most vulnerable to damage during subsequent handling and shipping. However, such elements must be securely mounted on the car and it is, therefore, very difficult to apply any conventional type of protective wrapping which will effectively protect the bumper and remain in place while the automobile is in transit. Furthermore, there is a problem of industrial safety involved since most conventional wrapping materials have sharp knife-like edges and the peculiar inaccessibility of automobile bumpers, when in place on the automobile, is such that the workers suffer many cut fingers and similar lacerations.

It is, therefore, the primary object of the present invention to provide a protective wrapping device for automobile bumpers and the like which is simple and economical in construction and can be easily applied to the bumper.

It is another object of the present invention to provide a protective wrapping of the type stated which will remain in place around the bumper during transit of the vehicle from the factory to point of ultimate distribution.

It is an additional object of the present invention to provide a protective wrapping of the type stated which is safe to use and will not subject the worker installing same to the hazard of cut fingers and similar lacerations.

With the above and other objects in view, my invention resides in the novel features of form, construction, arrangement, and combination of parts presently described and pointed out in the claims.

In the accompanying drawing—

Figure 1:
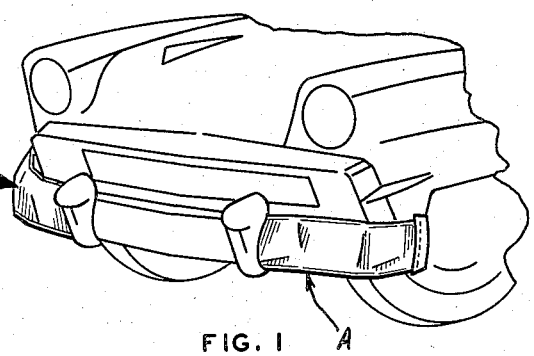
Fig. 1 is a perspective view of the front end of an automobile having a bumper to which are applied protective wrapping devices constructed in accordance with and embodying the present invention.

Referring now in more detail and by reference characters to the drawing, which illustrates preferred embodiments of the present invention, A designates a protective wrapping device or so-called "bumper bag" formed of two facewise overlying sheets 1, 2, of heavy kraft paper which are staggered along one longitudinal margin, as at b, and secured together by a narrow line of adhesive 3. Along their other longitudinal margins, the sheets 1, 2 are coincident, as at c.

The sheets 1, 2, are folded lengthwise along fold lines 4, 5, 6, to form a generally tubular bag-like element comprising a front wall 7, overlapping flaps 8, 9, and an inturned flange 10. Finally, one transverse end of the bumper bag A is closed by a U-shaped or channel-like closure strip 11 secured in place by a line of chainstitches 12. It should be noted that the closure strip 11 projects outwardly beyond the fold lines 4, 5, to form tabs which facilitate intentional removal of the bumper bag A when the automobile reaches its destination and is being readied for delivery to the purchaser.

Figure 2:
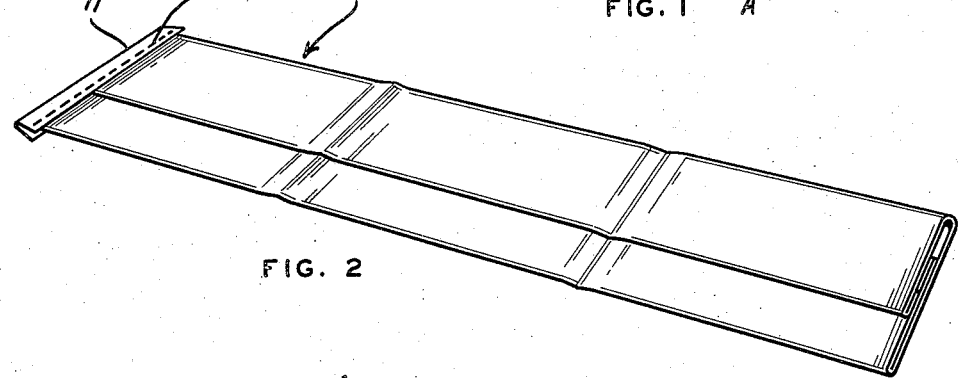
Fig. 2 is a perspective view of the wrapping device of the present invention.
Figure 3:
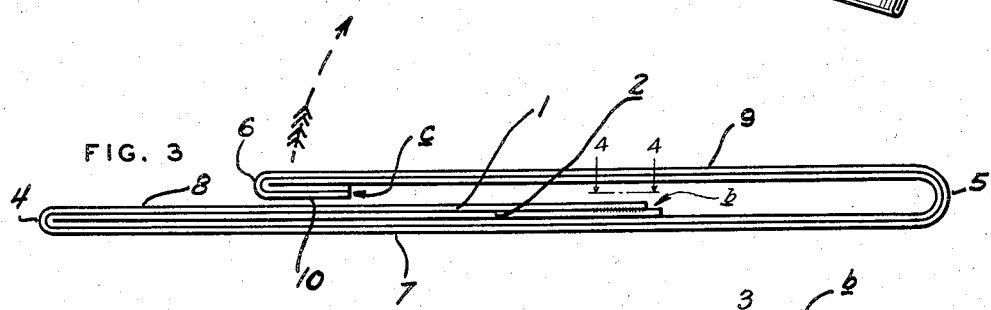
Fig. 3 is an end elevational view of the wrapping device of the present invention.
Figures 4, 5:
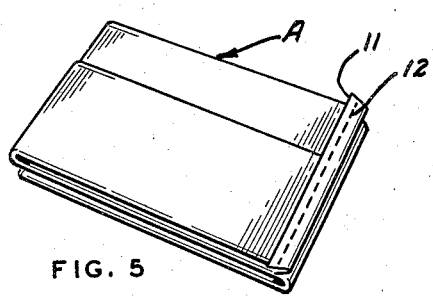
Fig. 4 is a fragmentary sectional view taken along line 4—4 of Fig. 3.
Fig. 5 is a perspective view of the protective wrapping device folded up for shipment and storage prior to actual use.

In use, the bumper bag A is folded lengthwise twice upon itself into a compact unit for shipment and storage prior to use, as shown in Fig. 5. When used, the bumper bag A is manually opened out flat, as shown in Fig. 2, and the flap 9 pulled outwardly in the direction of the arrow, as shown in Fig. 3. Thereupon, the flap 8 is similarly pulled out, so that the bumper bag A assumes a somewhat "opened-out" shape in which it can be easily slipped over the automobile bumper and the flaps 8, 9, folded back down into bumper-encasing position, as best seen in Fig. 1.

Because of the manner of construction of the margins b, c, the bumper bag A is easy to open, simple to install, and will not accidentally cut the fingers of the worker. Once installed, the bumper bag A will hold itself securely in place and effectively protect the bumper from scratches and other incidental damage. Finally, the bumper bag A can be quickly removed by grasping the extending tab-forming portions of the closure strip 11 and pulling outwardly.

It should be understood that changes and modifications in the form, construction, arrangement, and combination of the several parts of the bag-like protective wrapping for automobile bumpers and the like may be made and substituted for those herein shown and described without departing from the nature and principle of my invention.

Having thus described my invention, what I claim and desire to secure by Letters Patent is:

1. A protective slip-on wrapping comprising two facewise overlying sheets of heavy paper marginally glued together along one longitudinal edge by a relatively narrow line of adhesive and being elsewhere free of each other, said two sheets being folded lengthwise over upon themselves and overlapped in the formation of a tube having overlapped margins which are free of any fixed connection with each other and are also free of any fixed connection with the underlying portion of the tube in the area of the overlap, said overlapping margin being folded under in the provision of a free blunt edge, said blunt edge being spaced from the longitudinal margins of said tube, and closure means disposed across one transverse end of said tube, the other transverse end of said tube being open whereby the slip-on wrapping may be readily slipped onto elongated objects of irregular shapes such as automobile bumpers and the like.

2. A protective slip-on wrapping comprising two facewise sheets of heavy paper, said sheets being staggered slightly with respect to each other along one longitudinal margin, said sheets, furthermore, being secured together along said last-named longitudinal margin by a relatively narrow line of contact and being elsewhere free of each other, said two sheets being folded lengthwise over upon themselves and overlapped in the formation of a tube having overlapped margins which are free of any fixed connection with each other and are also free of any fixed connection with the underlying portion of the tube in the area of the overlap, said overlapping margin being folded under in the provision of a free blunt edge which is spaced outwardly from said first-named longitudinal margin, and closure means disposed across one transverse end of said tube, the other transverse end of said tube being open whereby the slip-on wrapping may be readily slipped onto elongated objects of irregular shapes such as automobile bumpers and the like.

3. A protective slip-on wrapping comprising two facewise sheets of heavy paper, said sheets being staggered slightly with respect to each other along one longitudinal margin, said sheets, furthermore, being secured together along said last-named longitudinal margin by a relatively narrow line of contact and being elsewhere free of each other, said two sheets being glued together along such staggered margin and being folded lengthwise over upon themselves and overlapped in the formation of a tube, having overlapped margins which are free of any fixed connection with each other and are also free of any fixed connection with the underlying portion of the tube in the area of the overlap, the unglued margin being outermost along the area of the overlap and being folded under in the provision of a blunt edge, and a U-shaped length of tape stitched to and disposed across one transverse end of said tube to form a closure thereacross, the other transverse end of said tube being open whereby the slip-on wrapping may be readily slipped onto elongated objects of irregular shapes such as automobile bumpers and the like.

References Cited in the file of this patent

UNITED STATES PATENTS

| | | |
|---|---|---|
| 646,025 | Goodman | Mar. 27, 1900 |
| 1,014,441 | Benton | Jan. 9, 1912 |
| 2,316,385 | Abramson | Apr. 13, 1943 |
| 2,322,654 | Moore | June 22, 1943 |
| 2,628,764 | Rubenstein | Feb. 17, 1953 |
| 2,679,887 | Doyle | June 1, 1954 |